United States Patent
Walster et al.

(10) Patent No.: US 6,915,321 B2
(45) Date of Patent: *Jul. 5, 2005

(54) METHOD AND APPARATUS FOR SOLVING SYSTEMS OF NONLINEAR EQUATIONS USING INTERVAL ARITHMETIC

(75) Inventors: G. William Walster, Cupertino, CA (US); Eldon R. Hansen, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 606 days.

This patent is subject to a terminal disclaimer.

(21) Appl. No.: 10/042,908

(22) Filed: Jan. 8, 2002

(65) Prior Publication Data

US 2003/0131034 A1 Jul. 10, 2003

(51) Int. Cl.$^7$ .................................................. G06F 7/38
(52) U.S. Cl. ...................................................... 708/446
(58) Field of Search ................................ 708/440, 441, 708/446

(56) References Cited

U.S. PATENT DOCUMENTS

| | | | | |
|---|---|---|---|---|
| 5,008,672 A | * | 4/1991 | Leedy | 341/138 |
| 5,014,230 A | * | 5/1991 | Sinha et al. | 703/2 |
| 6,327,581 B1 | * | 12/2001 | Platt | 706/12 |
| 6,560,623 B1 | * | 5/2003 | Smith | 708/551 |
| 6,563,566 B2 | * | 5/2003 | Rosenbluth et al. | 355/67 |

OTHER PUBLICATIONS

E.R. Hansen, "Global Optimization Using Interval Analysis," Marcel Dekker, Inc., New York, NY, 1992.

(Continued)

*Primary Examiner*—Chuong Dinh Ngo
(74) *Attorney, Agent, or Firm*—Park, Vaughan & Fleming LLP

(57) ABSTRACT

One embodiment of the present invention provides a computer-based system for solving a system of nonlinear equations specified by a vector function, f, wherein f(x)=0 represents $f_1(x)=0, f_2(x)=0, f_3(x)=0 \ldots, f_n(x)=0$, wherein x is a vector $(x_1, X_2, X_3, \ldots x_n)$. The system operates by receiving a representation of a subbox $X=(X_1, X_2, \ldots, X_n)$, wherein for each dimension, i, the representation of $X_i$, includes a first floating-point number, $a_i$, representing the left endpoint of $X_i$, and a second floating-point number, $b_i$, representing the right endpoint of $X_i$. The system stores the representation in a computer memory. Next, the system applies term consistency to the set of nonlinear equations, $f_1(x)=0, f_2(x)=0, f_3(x)=0, \ldots, f_n(x)=0$, over X, and excludes portions of X that violate the set of nonlinear equations. The system also applies box consistency to the set of nonlinear equations over X, and excludes portions of X that violate the set of nonlinear equations. Finally, the system performs an interval Newton step on X to produce a resulting subbox Y, wherein the point of expansion of the interval Newton step is a point x within X, and wherein performing the interval Newton step involves evaluating f(x) using interval arithmetic to produce an interval result f'(x). The system integrates the sub-parts of the process with branch tests designed to increase the overall speed of the process.

7 Claims, 8 Drawing Sheets

OTHER PUBLICATIONS

R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63–78 http://interval.louisiana.edu/preprints.html.

R. B. Kearfott, Algorithm 763: Interval Arithmetic: A Fortran 90 Module for an Interval Data Type, ACM Trans. Math. Software, 22, vol. 4, 1996, pp. 385–392. http://interval.louisiana.edu/preprints.html.

R. B. Kearfott, M. Dawande, K.S. Du, and C. Hu, "Algorithm 737: INTLIB: A Portable Fortran 737 Interval Standard Function Library," ACM Trans. Math. Software, 20, vol. 4, Dec. 1994, pp. 447–458.

R. B. Kearfott and G. W. Walster, "On Stopping Criteria in Verified Nonlinear Systems or Optimization Algorithms," ACM Trans. Math. Software, 26, vol. 3, Sep. 2000, pp. 323–351. The publication itself says Received: Jul. 1999; revised: Mar. 2000; accepted: Mar. 2000. http://interval.louisiana.edu/preprints.html.

R.E. Moore and S. T. Jones "Safe Starting Regions for Iterative Methods", SIAM Journal on Numerical Analysis, vol. 14, No. 6 (Dec. 1977), pp. 1051–1065.

A. Neumaier, "The Enclosure of Solutions of Parameter-Dependent Systems of Euqations," Cambridge University Press, Cambridge, 1990, ISBN: 0–12–505630–3, Reliability in Computing pp. 269–286.

S.M. Rump, "Verification Methods for Dense and Sparse Systems of Equations," in Topics in Validated Computations: Proceedings of the IMACS–GAMM International Workshop on Validated Computations, University of Oldenburg, J. Herzberger, ed., Elsevier Studies in Computational Mathematics, Elsever, 1994, pp. 63–136.

Pascal Van Hentenryck, Vijay Saraswat and Yves Deville, "Design, Implementation, and Evaluation of the Constraint Language cc (FD)," Elsevier Science, Inc., 1998. p. 139–164

* cited by examiner $$X \equiv [\underline{x}, \bar{x}] \equiv \{x \in \Re^* | \underline{x} \leq x \leq \bar{x}\}$$

$$Y \equiv [\underline{y}, \bar{y}] \equiv \{y \in \Re^* | \underline{y} \leq y \leq \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})]$, if $0 \notin Y$ $X/Y \subseteq \Re^*$, if $0 \in Y$

FIG. 5

METHOD AND APPARATUS FOR SOLVING SYSTEMS OF NONLINEAR EQUATIONS USING INTERVAL ARITHMETIC

RELATED APPLICATION

The subject matter of this application is related to the subject matter in a co-pending non-provisional application by the same inventors as the instant application entitled, "Solving Systems Of Nonlinear Equations Using Interval Arithmetic And Term Consistency", having Ser. No. 09/991,477, and a filing date of 16, Nov. 2001.

BACKGROUND

1. Field of the Invention

The present invention relates to performing arithmetic operations on interval operands within a computer system. More specifically, the present invention relates to a method and an apparatus for using a computer system to solve a system of nonlinear equations with interval arithmetic.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

One commonly performed computational operation is to find the roots of a nonlinear equation. This can be accomplished using Newton's method. The interval version of Newton's method works in the following manner. From the mean value theorem, $$f(x)-f(x^*)=(x-x^*)f'(\xi),$$

where $\xi$ is some generally unknown point between x and x*. If x* is a zero of $f$, then $f(x^*)=0$ and, from the previous equation, $$x^*=x-f(x)/f'(\xi).$$

Let X be an interval containing both x and x*. Since $\xi$ is between x and x*, it follows that $\xi \in X$ Moreover, from basic properties of interval analysis it follows that $f'(\xi) \in f'(X)$. Hence, $x^* \in N(x,X)$ where $$N(x,X)=x-f(x)/f'(X).$$

Temporarily assume $0 \notin f'(X)$ so that N(x,X) is a finite interval. Since any zero of $f$ in X is also in N(x,X), the zero is in the intersection $X \cap N(x,X)$. Using this fact, we define an algorithm for finding x*. Let $X_0$ be an interval containing x*. For n=0, 1, 2, . . . define $$x_n=m(X_n)$$

$$N(x_n,X_n)=x_n-f'(x_n)/f'(X_n)$$

$$X_{n+1}=X_n \cap N(x_n,X_n),$$

wherein m(X) is the midpoint of the interval X, and the notation $f'(x_n)$ makes explicit the fact that evaluating $f$ at the point $x_n$ must be done using interval arithmetic. We call $x_n$ the point of expansion for the Newton method. It is not necessary to choose $x_n$ to be the midpoint of $X_n$. The only requirement is that $x_n \in X_n$ to assure that $x^* \in N(x_n, X_n)$. However, it is convenient and efficient to choose $x_n=m(X_n)$. Note that the roots of an interval equation can be intervals rather than points when the equation contains non-degenerate interval constants or parameters.

The interval version of Newton's algorithm for finding roots of nonlinear equations is designed to work best "in the small" when nonlinear equations are approximately linear. For large intervals containing multiple roots, the interval Newton algorithm splits the given interval into two sub-intervals that are then processed independently. By this mechanism all the roots of a nonlinear equation can be found.

One problem is applying the multivariate generalization of the interval Newton algorithm to large n-dimensional interval vectors (or boxes) that contain multiple roots. In this case, the process of splitting in n-dimensions can lead to exponential growth in the number of boxes to process.

It is well known that this problem (and even the problem of computing "sharp" bounds on the range of a function of n-variables over an n-dimensional box) is an "NP-hard" problem. In general, NP-hard problems require an exponentially increasing amount of work to solve as n, the number of independent variables, increases.

Because NP-hardness is a worst-case property and because many practical engineering and scientific problems have relatively simple structure, one problem is to use this simple structure of real problems to improve the efficiency of interval nonlinear equation solving algorithms.

Hence, what is needed is a method and an apparatus for using the structure of nonlinear equations to improve the efficiency of interval root-bounding software. To this end, what is needed is a method and apparatus that efficiently deletes boxes or parts of "large" boxes that the interval Newton algorithm can only split.

SUMMARY

The present invention combines various methods to speed up the solution of systems of nonlinear equations. The combined methods use the structure of nonlinear equations to efficiently delete parts of all of large sub-boxes that would otherwise have to be split. One embodiment of the present invention provides a computer-based system for solving a system of nonlinear equations specified by a vector function, f, wherein f(x)=0 represents $f_1(x)=0, f_2(x)=0, f_3(x)=0, \ldots, f_n(x)=0$, and wherein x is a vector $(x_1, x_2, x_3, \ldots x_n)$. The system operates by receiving a representation of a subbox $X=(X_1, X_2, \ldots, X_n)$, wherein for each dimension, i, the representation of $X_i$ includes a first floating-point number, $a_i$, representing the left endpoint of $X_i$, and a second floating-point number, $b_i$, representing the right endpoint of $X_i$. For each nonlinear equation $f_i(x)=0$ in the system of equations f(x)=0, each individual component function $f_i(x)=0$ can be written in the form $g(x'_j)=h(x)$, where g can be analytically inverted so that an explicit expression for $x'_j$ can be obtained: $x'_j=g^{-1}(h(x))$.

For each component function $f_i$ there are different ways to analytically solve for a component $x_j$ of the vector x. For each of these rearrangements, if a given interval box X is used as an argument of h, and if $X_j^+ = X_j \cap X'_j$, where $X'_j = g^{-1}(h(X))$, then the new interval $X_j^+$ for the j-th component of X is guaranteed to be at least as narrow as the original $X_j$.

This process is then be iterated for different terms g of each component function $f_i$. After reducing any element $X_j$ of the box X to $X_j^+$, the reduced value can be used in X thereafter to speed up the reduction process using other component functions and terms thereof.

Hereafter, the notation $g(x_j)$ for a term of a component function $f_i(x)$ implicitly represents any term of any component function. This eliminates the need for additional subscripts that do not add clarity to the exposition.

One embodiment of the present invention provides a system that receives a representation of a subbox X and then stores the representation in a computer memory. Next, the system applies term consistency to the set of nonlinear equations, $f_1(x)=0, f_2(x)=0, f_3(x)=0, \ldots, f_n(x)=0$, over X, and excludes portions of X that violate the set of nonlinear equations. The system also applies box consistency to the set of nonlinear equations over X, and excludes portions of X that violate the set of nonlinear equations. Finally, the system performs an interval Newton step on X to produce a resulting subbox Y, wherein the point of expansion of the interval Newton step is a point x within X, and wherein performing the interval Newton step involves evaluating f(x) using interval arithmetic to produce an interval result f'(x).

In a variation on this embodiment, while performing the interval Newton step, the system computes J(x,X), wherein J(x,X) is the Jacobian of the gradient of the function f evaluated as a function of x over the subbox X. The system then computes a preconditioned Jacobian, M(x,X)=BJ(x,X), wherein B is an approximate inverse of the center of J(x,X). Next, the system uses the Hull method to solve for the resulting subbox Y that contains the values of y that satisfy M(x,X)(y−x)=r(x), where r(x)=−Bf(x). In the process, M(x, X) and J(x,X) are proved to be regular. An interval matrix is regular if it contains no singular matrices.

In a variation on this embodiment, the system applies term consistency to the preconditioned set of nonlinear equations Bf(x)=0 over the subbox X, and excludes portions of X that violate the preconditioned set of nonlinear equations.

In a variation on this embodiment, the system applies box consistency to the preconditioned set of nonlinear equations Bf(x)=0 over the subbox X, and excludes portions of X that violate the preconditioned set of nonlinear equations.

In a variation on this embodiment, the system evaluates a first termination condition. This first termination condition is TRUE if zero is contained within f'(x), J(x,X) is regular, and Y is contained within X. If the first termination condition is TRUE, the system terminates and records X=X∩Y as a final bound.

In further variation, the system evaluates a second termination condition. This second termination condition is TRUE if a function of the width of the subbox X is less than a pre-specified value, $\epsilon_X$, and the width of the function f over the subbox X is less than a pre-specified value, $\epsilon_F$. If the second termination condition is TRUE, the system terminates and records X as the final bound.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
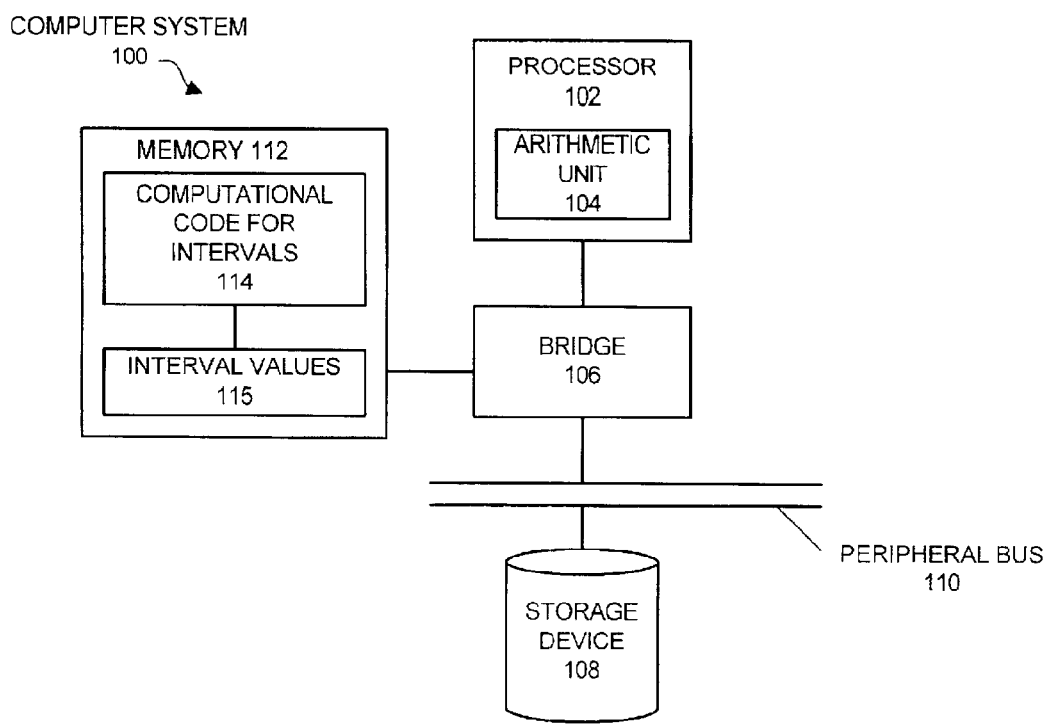
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
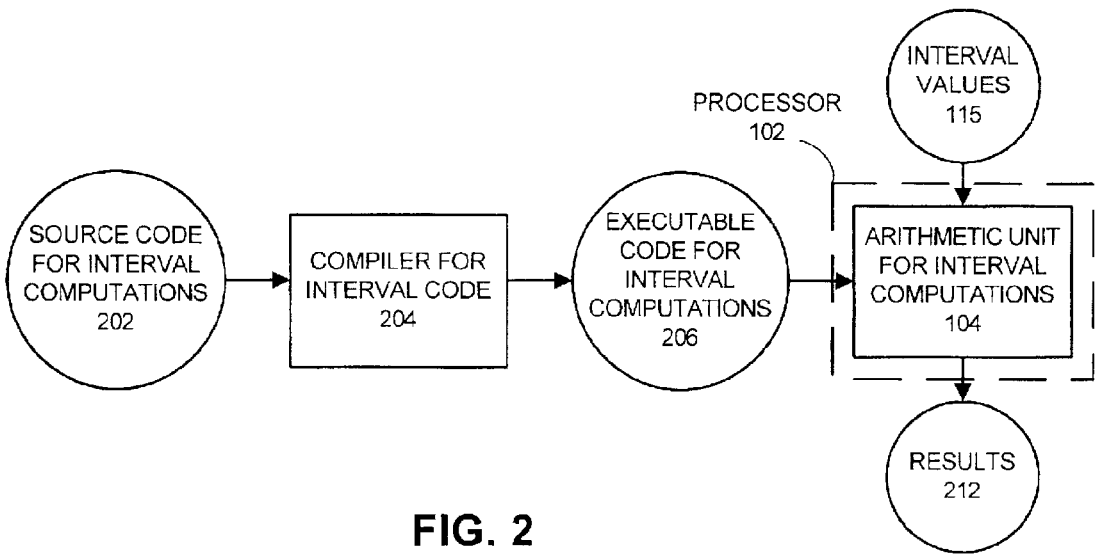
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
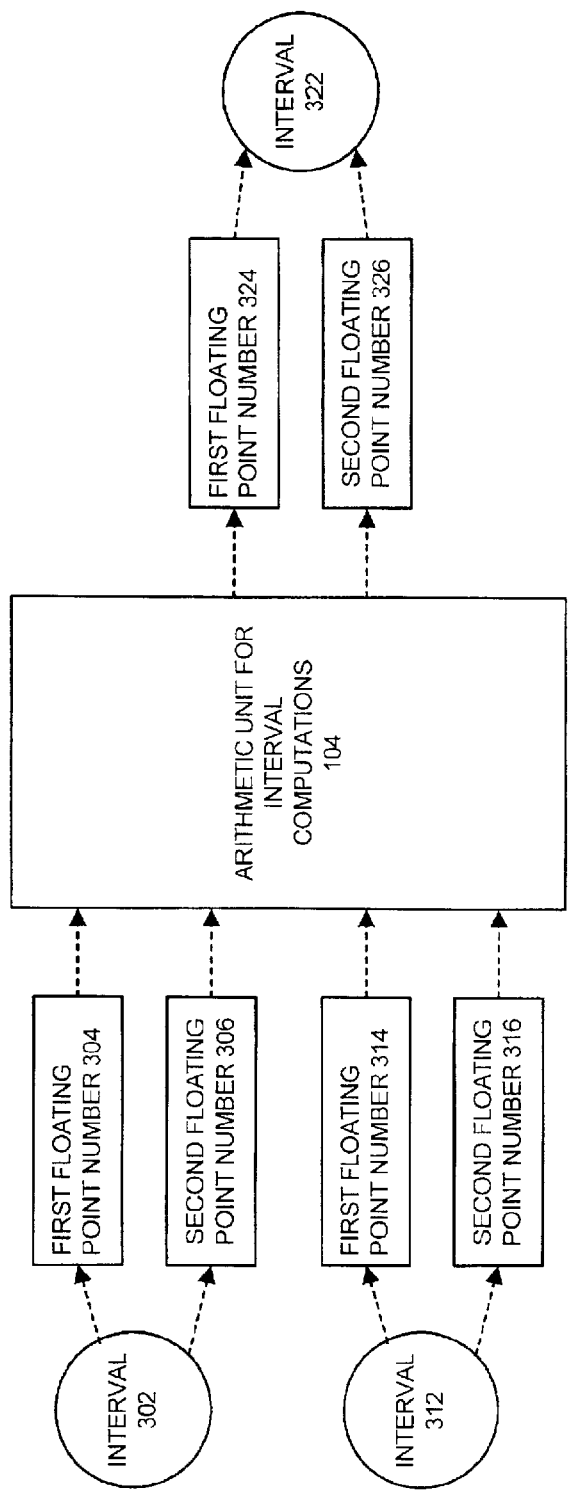
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
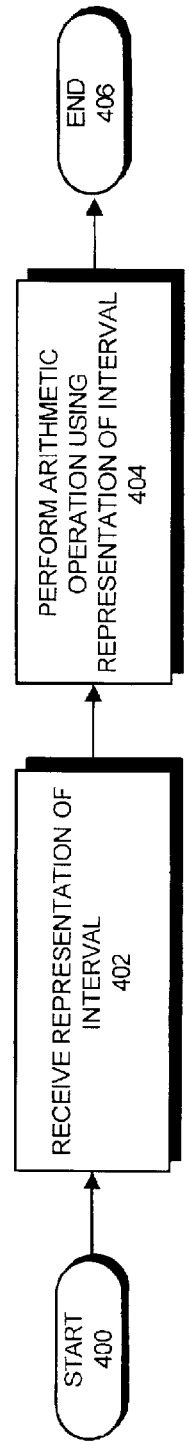
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, x denotes the lower bound of X, and $\overline{x}$ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x,x]. Also note that the left endpoint of an interior interval is always less than or equal to the right endpoint. The set of extended real numbers, R* is the set of real numbers, R, extended with the two ideal points negative infinity and positive infinity:

$$R^* = R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Interval Version of Newton's Method for Systems of Nonlinear Equations

Figure 6:
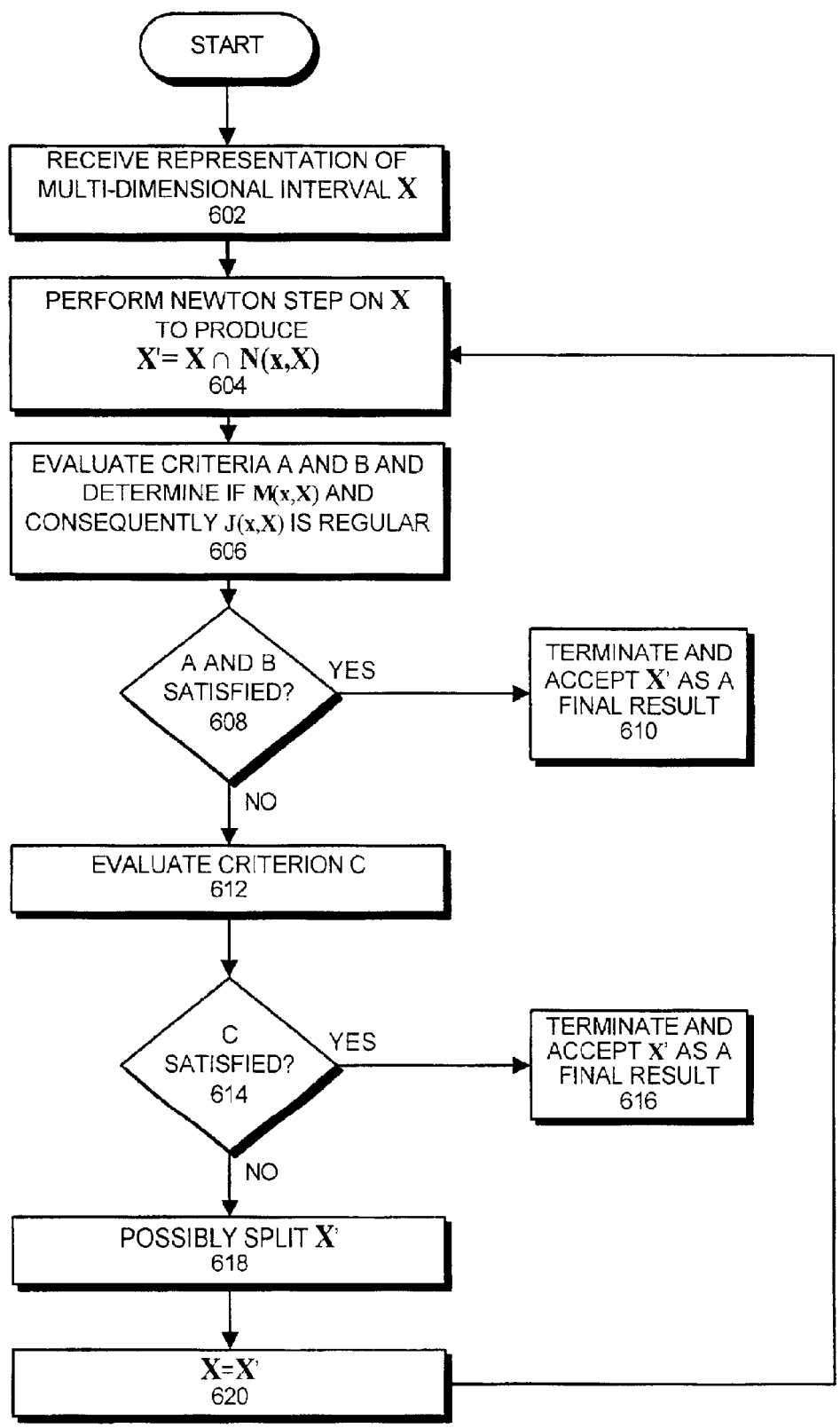
FIG. 6 illustrates a process of solving for zeros of a vector function that specifies a system of nonlinear equations using the interval Newton method.

FIG. 6 illustrates the process of using the interval Newton method without the present invention to solve for zeros of a vector function that defines a system of nonlinear equations. The system starts with a multi-variable function f(x)=0, wherein x is a vector $(x_1, x_2, x_3, \ldots x_n)$, and wherein f(x)=0 represents a system of equations $f_1(x)=0$, $f_2(x)=0$, $f_3(x)=0, \ldots, f_n(x)=0$.

Next, the system receives a representation of a box X (step 602). In one embodiment of the present invention, for each dimension, i, the representation of $X_i$ includes a first floating-point number, $a_i$, representing the left endpoint of $X_i$ in the i-th dimension, and a second floating-point number, $b_i$, representing the right endpoint of $X_i$.

The system then performs a Newton step on X, wherein the point of expansion is typically x=m(X) the midpoint of the box X, to compute a resulting interval X'=X∩N(x,X) (step 604).

Next, the system evaluates termination criteria A and B, which relate to the size of the box X' and the function f, respectively (step 606). Criterion A is satisfied if the width of the interval X', w(X'), is less than $\epsilon_X$ for some user-specified $\epsilon_X > 0$, wherein w(X') is be defined as the maximum width of any component $X_i$ of the interval X'. Note that $\epsilon_X$ is user-specified and is an absolute criterion. Criterion A can alternatively be a relative criterion w(X')/|X'|<$\epsilon_X$ if the box X' does not contain zero. Moreover, $\epsilon_X$ can be a vector, $\epsilon_X$, wherein there exists a separate component $\epsilon_{X1}$, for each dimension in the box X'. In this case, components containing zero can use absolute criteria, while other components use relative criteria.

Criterion B is satisfied if $\|f\| < \epsilon_F$ for some user-specified $\epsilon_F > 0$, wherein $\|f\| = \max(|f_1(X')|, |f_2(X')|, |f_3(X')|, \ldots, |f_n(X')|)$. Note that as with $\epsilon_X$ element-specific values $\epsilon_{F1}$, can be used, but they are always absolute.

However they are defined, if criteria A and B are satisfied, the system terminates and accepts X' as the final bounding box for the zeros of f (step 610). Otherwise, if either criterion A or criterion B is not satisfied, the system proceeds to evaluate criterion C (step 612).

Criterion C is satisfied if three conditions are satisfied. A first condition is satisfied if zero is contained within $f'(x)$, wherein x is a point within the box X, and wherein $f'(x)$ is a box that results from evaluating f(x) using interval arithmetic. Note that performing the interval Newton step in step 604 involves evaluating f(x) to produce an interval result $f'(x)$. Hence, $f'(x)$ does not have to be recomputed for criterion C.

A second condition is satisfied if M(x,X)=BJ(x,X) is regular. J(x,X) is the Jacobian (matrix of first order partial derivatives) of the vector function f as a function of the point x in the interval X. B is an approximate inverse of the center of J(x,X). Note that multiplying J(x,X) by B preconditions J(x,X) so it is easier to determine whether J(x,X) is regular. Hence, M(x,X) is referred to as the "preconditioned" Jacobian.

Finally, a third condition is satisfied if X=X'. This indicates that the interval Newton step (in step 604) failed to make progress.

If criterion C is satisfied, the system terminates and accepts X' as a final bounding box for the zeros of f (step 616).

Otherwise, if criterion C is not satisfied, the system returns for another iteration. This may involve splitting X' into multiple intervals to be separately solved if the Newton step has not made sufficient progress to assure convergence at a reasonable rate (step 618). The system then sets X=X' (step 620) and returns to step 604 to perform another interval Newton step.

The above-described process works well if tolerances $\epsilon_X$ and $\epsilon_F$ are chosen "relatively large". In this case, processing stops early and computing effort is relatively small.

Figure 7:
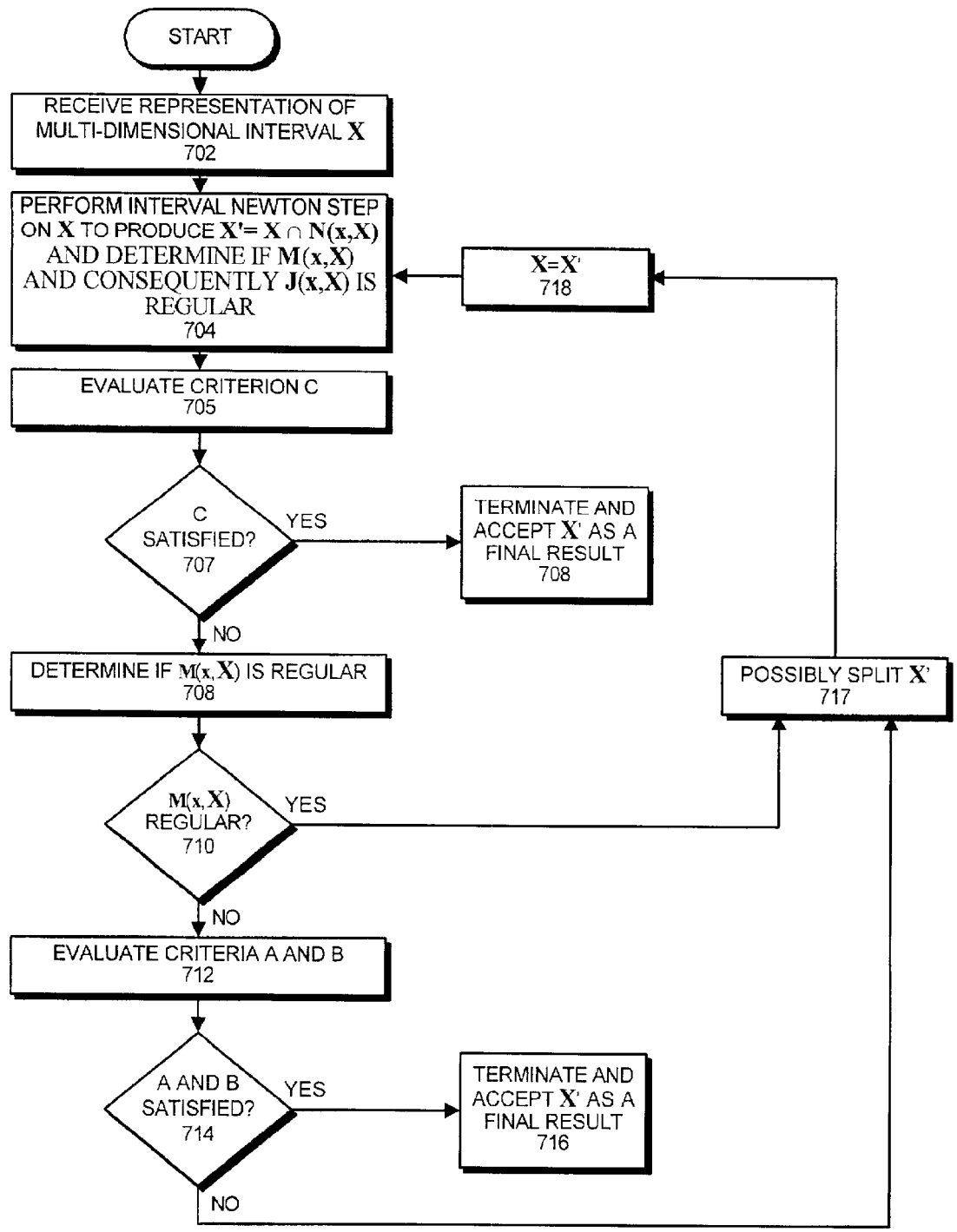
FIG. 7 illustrates another process of solving for zeros of a function that specifies a system of nonlinear equations using the interval Newton method in accordance with an embodiment of the present invention.

Alternatively, the process illustrated in FIG. 7 seeks to produce to best (or near best) possible result for simple zeros, again without the present invention. The system starts with a multi-variable function f(x)=0. Next, the system receives a representation of a box X (step 702). The system then performs a Newton step on X, wherein the point of expansion is x∈X, to compute a resulting interval X'=X∩N(x,X) (step 704).

Next, the system evaluates criterion C (step 705). If criterion C is satisfied, the system terminates and accepts X' as a final bounding box for the zeros of f (step 708). Otherwise, if criterion C is not satisfied, the system proceeds to determine if M(x,X) is regular (step 709).

If M(x,X) is regular, the system returns for another iteration. This may involve splitting X' into multiple intervals to be separately solved if the Newton step has not made sufficient progress to assure convergence at a reasonable rate (step 717). The system also sets X=X' (step 718) before returning to step 704 to perform another interval Newton step.

If M(x,X) is not regular, the system evaluates termination criteria A and B (step 712). If criteria A and B are satisfied, the system terminates and accepts X' as a final bounding box for the zeros of f (step 716). Otherwise, if either criterion A or criterion B is not satisfied, the system returns for another iteration (steps 717 and 718).

Term Consistency

Figure 8:
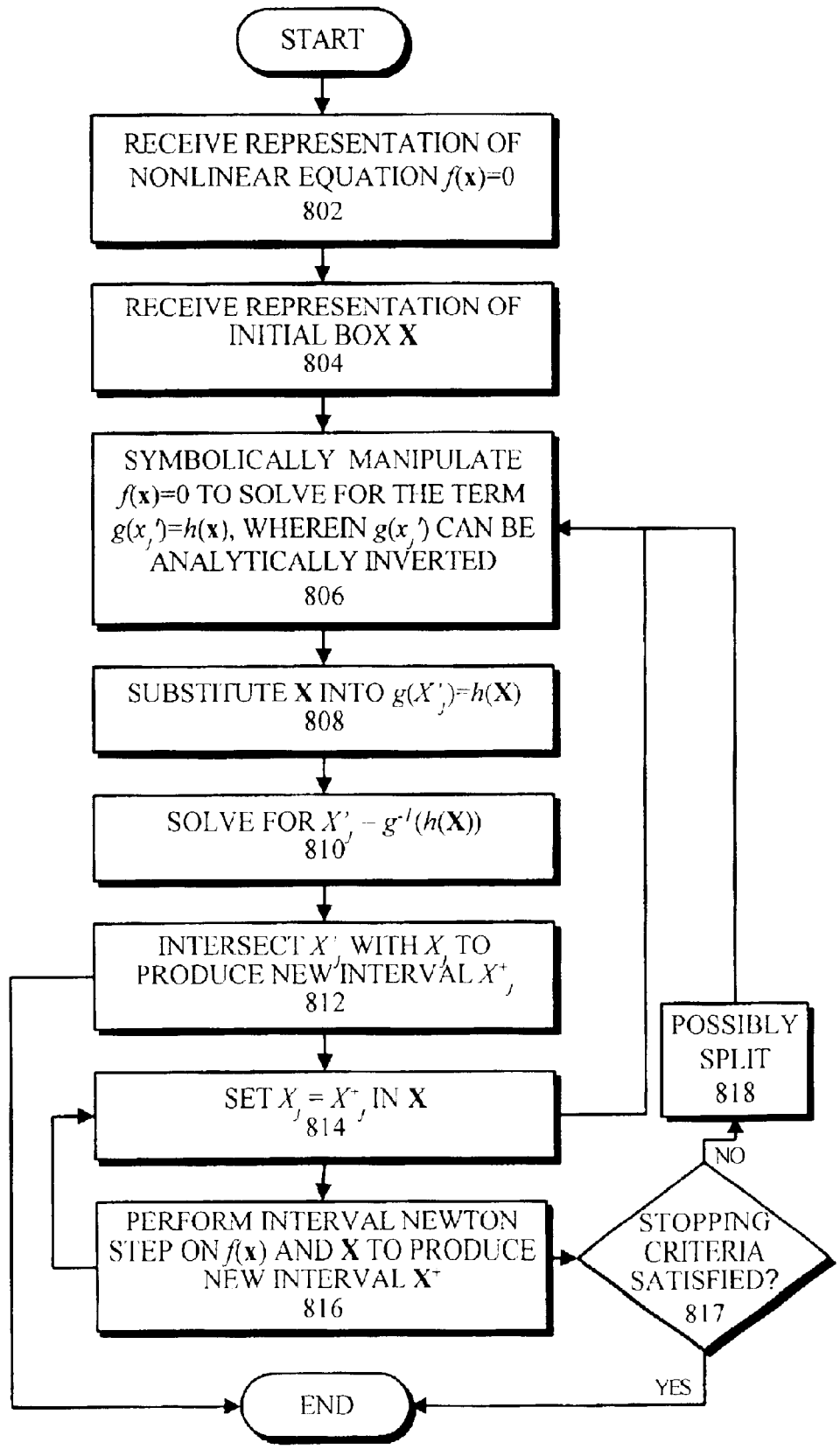
FIG. 8 is a flow chart illustrating the process of finding an interval solution to a single nonlinear equation in accordance with an embodiment of the present invention.

FIG. 8 is a flow chart illustrating the process of solving a single nonlinear equation through interval arithmetic and term consistency in accordance with an embodiment of the present invention. This is the process designed to work well for large boxes X when otherwise the interval Newton method must repeatedly split the given box into sufficiently small subboxes. The system starts by receiving a representation of a nonlinear equation $f(x)=0$ (step 802), as well as a representation of an initial box X (step 804). Next, the system symbolically manipulates the equation $f(x)=0$ to solve for a term $g(x_j)=h(x)$, wherein the term $g(x_j)$ can be analytically inverted to produce the inverse function $g^{-1}$ (step 806).

Next, the system substitutes the initial box X into h(X) to produce the equation $g(X'_j)=h(X)$ (step 808). The system then solves for $X'_j=g^{+1}(h(X))$ (step 810). The resulting interval $X'_j$ is then intersected with the initial interval $X_j$ to produce a new interval $X^+_j$ (step 812).

At this point, the system can terminate. Otherwise, the system can perform further processing. This further processing involves setting $X_j=X_j^+$ in X (step 814) and then either returning to step 806 for another iteration of term consistency on another term of $f(x)$, or by performing an interval Newton step on $f(x)$ and X to produce a new interval $X^+$ (step 816). At this point, if stopping criteria are satisfied (step 817), the system possibly splits the box (step 818) and returns to step 806.

Examples of Applying Term Consistency

For example, suppose $f(x)=x^2-x+6$. We can define $g(x)=x^2$ and $h(x)=x-6$. Let X=[-10,10]. The procedural step is $(X')^2=X-6=[-16,4]$. Since $(X')^2$ must be non-negative, we replace this interval by [0,4]. Solving for X', we obtain $X'=\pm[0,2]$. In replacing the range of h(x)(i.e., [-16,4]) by non-negative values, we have excluded that part of the range h(x) that is not in the domain of $g(x)=x^2$.

Suppose that we reverse the roles of g and h and use the iterative step $h(X')=g(X)$. That is $X'-6=X^2$. We obtain X'= [6,106]. Intersecting this result with the interval [-10,10], of interest, we obtain [6,10]. This interval excludes the set of values for which the range of g(X) is not in the intersection of the domain of h(X) with X.

Combining these results, we conclude that any solution of $f(X)=g(X)-h(X)=0$ that occurs in X=[-10,10] must be in both [-2,2] and [6,10]. Since these intervals are disjoint, there can be no solution in [-10,10].

In practice, if we already reduced the interval from [-10,10] to [-2,2] by solving for g, we use the narrower interval as input when solving for h.

This example illustrates the fact that it can be advantageous to solve a given equation for more than one of its terms. The order in which terms are chosen affects the efficiency. Unfortunately, it is not known how best to choose the best order.

Also note that there can be many choices for g(x). For example, suppose we use term consistency to narrow the interval bound X on a solution of $f(x)=ax^4+bx+c=0$. We can let g(x)=bx and compute $X'=-(aX^4+c)/b$ or we can let $g(x)=ax^4$ and compute $X'=\pm[-(bX+c)/a]^{1/4}$. We can also separate $x^4$ into $x^2*x^2$ and solve for one of the factors $X'=\pm[-(bX+c)/(aX^2)]^{1/2}$.

In the multidimensional case, we may solve for a term involving more than one variable. We then have a two-stage process. For example, suppose we solve for the term $1/(x+y)$ from the function $f(x,y)=1/(x+y)-h(x,y)=0$. Let $x\in X=[1,2]$ and $y\in Y=[0.5,2]$. Suppose we find that $h(X,Y)=[0.5,1]$. Then $1/(x+y)\in[0.5,1]$ so $x+y\in[1,2]$. Now we replace y by Y=[0.5,2] and obtain the bound [-1,1.5] on X. Intersecting this interval with the given bound X=[1,2] on x, we obtain the new bound X'=[1,1.5].

We can use X' to get a new bound on h; but this may require extensive computing if h is a complicated function; so suppose we do not. Suppose that we do, however, use this bound on our intermediate result x+y=[1,2]. Solving for y as [1,2]-X', we obtain the bound [-0.5,1]. Intersecting this interval with Y, we obtain the new bound Y'=[0.5,1] on y. Thus, we improve the bounds on both x and y by solving for a single term of $f$.

The point of these examples is to show that term consistency can be used in many ways both alone and in combination with the interval Newton algorithm to improve the efficiency with which roots of a single nonlinear equation within a large box can be computed. The same is true for systems of nonlinear equations.

Solving a System of Nonlinear Equations

Figure 9A:
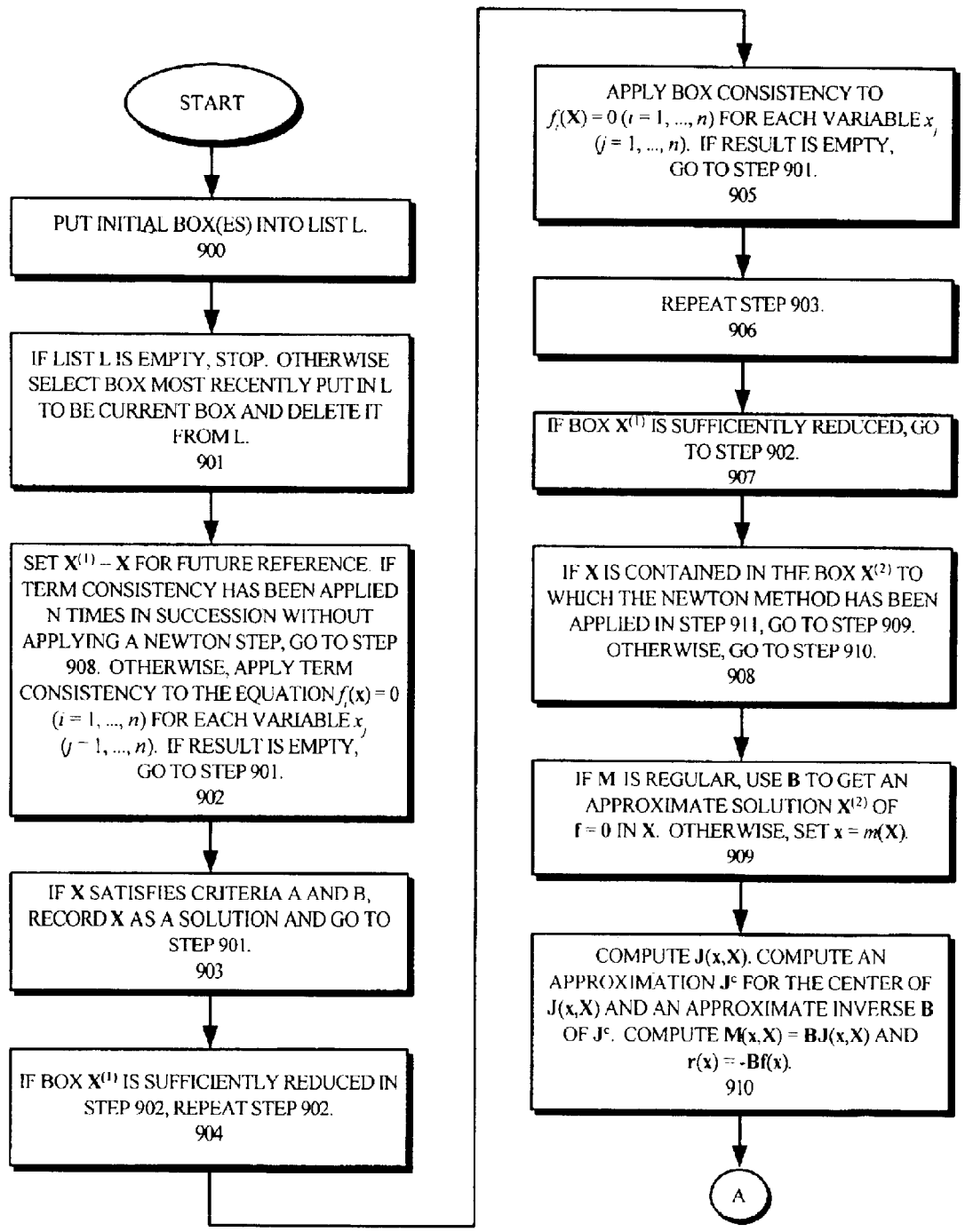
FIG. 9A is portion of a flow chart illustrating the process of finding an interval solution to a system of nonlinear equations in combination with the interval Newton method for finding roots of nonlinear functions in accordance with an embodiment of the present invention.
Figure 9B:
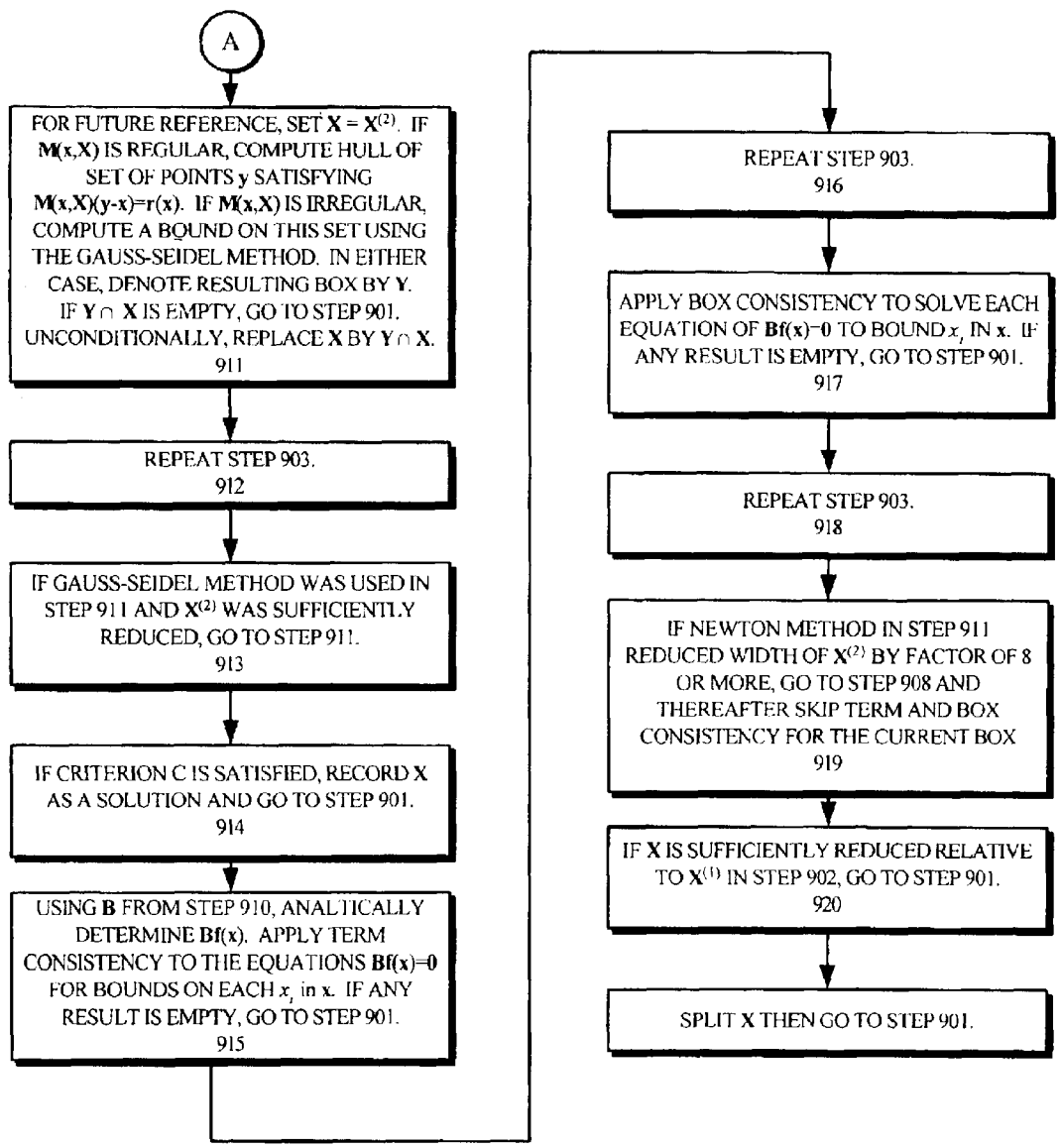
FIG. 9B is another portion of a flow chart illustrating the process of finding an interval solution to a system of nonlinear equations in accordance with an embodiment of the present invention.

FIGS. 9A and 9B present a flow chart illustrating the process of finding an interval solution to a system of nonlinear equations using term consistency in combination with the interval Newton method for finding roots of nonlinear functions in accordance with an embodiment of the present invention.

We assume that an initial box $X^{(0)}$ is given. We seek all zeros of the function f in this box. However, note that more than one box can be given. As the process proceeds, it usually generates various sub-boxes of $X^{(0)}$. These sub-boxes are stored in a list L waiting to be processed. At any given time, the list L may be empty or may contain several (or many) boxes.

The steps of the process are generally performed in the order given below except as indicated by branching. The current box is denoted by X even though it changes from step to step. We assume the tolerances $\epsilon_X$ and $\epsilon_F$ are given by the user.

The system first puts the initial box(es) in the list L (step 900). If the list L is empty, the system stops. Otherwise, the system selects the box most recently put in L to be the current box, and deletes it from L (step 901).

Next, for future reference, the system stores a copy of the current box X. This copy is referred to as $X^{(1)}$. If term consistency previously has been applied n times in succession without applying a Newton step, the system goes to step 908 to do so. (In making this count, the system ignores any applications of box consistency.) Otherwise, the system applies term consistency to the equation $f_i(x)=0 (i=1,\ldots,n)$ for each variable $x_j(j=1,\ldots,n)$. To do so, the system cycles through both equations and variables, updating X whenever the width of an element $X_j$ is reduced. If any result is empty, the system goes to step 901 (step 902).

If X satisfies both Criteria A and B discussed with reference to X' in FIG. 6 above, the system records X as a solution and goes to step 901 (step 903).

If the box $X^{(1)}$ was "sufficiently reduced" in step 902, the system repeats step 902 (step 904). Note that we need a criterion to test when a box is "sufficiently reduced" in size during a step or steps of our process. The purpose of the criterion is to enable us to decide when it is not necessary to split a box, thereby allowing any procedure that sufficiently reduces the box to be repeated. Let X denote a box to which the process is applied in a given step. Assume that X is not entirely deleted by the process. Then either X or a sub-box, say X', of X is returned. It may have been determined that a gap can be removed from one or more components of X'. If so, we may choose to split X' by removing the gap(s). For now, assume we ignore gaps.

We avoid these difficulties by requiring that for some $i=1, \ldots, n$, we have $w(X_i) - w(X_i') < \gamma w(X)$ for some constant $\gamma$ where $0 < \gamma < 1$. This assumes that at least one component of X is reduced in width by an amount related to the widest component of X. We choose $\gamma = 0.25$.

Thus, we define $D = 0.25w(X) - \max_{(1 \leq i \leq n)}(w(X_i) - w(X_i'))$. We say that X is "sufficiently reduced" if $D \leq 0$. The system also unconditionally sets $X = X'$.

Next, the system applies box consistency to the equation $f_i(x) = 0 (i=1, \ldots, n)$ for each variable $x_j (j=1, \ldots, n)$. (Box consistency is described in "Global Optimization Using Interval Analysis" by Eldon R. Hansen, Marcel Dekker, Inc., 1992.) If any result is empty, the system goes to step 901 (step 905).

The system next repeats step 903 (step 906).

If the current box X is a sufficiently reduced version of the box $X^{(1)}$ defined in step 902, the system goes to step 902 (step 907).

If X is contained in a box $X^{(2)}$ to which the Newton method has been applied in step 911 below, the systems goes to step 909. Otherwise, the system goes to step 910 (step 908).

When the Newton method is applied to $X^{(2)}$ in step 911 below, a preconditioning matrix B and a preconditioned Jacobian M are computed. If M is regular, the system uses B in an "inner iteration procedure" to get an approximate solution x of f=0 in X (step 909). (see Hansen, E. R. and Greenberg, R. I., 1983, An interval Newton method, Appl. Math. Comput. 12, 89–98.) Otherwise, if M is not regular, the system sets $x = m(X)$.

Next, the system computes $J(x,X)$ using either an expansion in which some of the arguments are replaced by real (non-interval) quantities (see Hansen, E. R., 1968, On solving systems of equations using interval arithmetic, Math. Comput. 22, 374–384.) or else using slopes. If the point x was obtained in step 909, the system uses it as the point of expansion. The system also computes an approximation $J^C$ for the center of $J(x,X)$ and an approximate inverse B of $J^C$. The system additionally computes $M(x,X) = BJ(x,X)$ and $r(x) = -Bf(x)$ (step 910).

Note that the system computes B using a "special procedure" so that a result B is computed even if $J^C$ is singular. When using the Gauss-Seidel method, we can regard preconditioning as an effort to compute a matrix that is diagonally dominant. Even when $A^C$ is singular, we can generally compute a matrix B such that some diagonal elements dominate the off-diagonal elements in their row. This improves the performance of Gauss-Seidel. To compute B when $A^C$ is singular, we can begin the Gaussian elimination procedure. When a pivot element is zero, we replace it by some small quantity and proceed. This enables us to complete the elimination procedure and compute a result B. A similar step can be used if a triangular factorization method is used to try to invert $A^C$.

For further reference, the system saves X as $X^{(2)}$. At this point, if $M(x,X)$ is regular, the system computes the hull of the set of points y satisfying $M(x,X)(y-x) = r(x)$ (see Hansen, E. R., 1988, Bounding the solution of interval linear equations, SIAM J. Numer. Anal., 28, 1493–1503). If $M(x,X)$ is irregular, the system computes a bound on this set using one step of the Gauss-Seidel method. In either case, the system denotes the resulting box by Y. If $Y \cap X$ is empty, the system goes to step 901. Otherwise, the system replaces X by $Y \cap X$. (step 911).

Next, the system repeats step 903 (step 912).

If the Gauss-Seidel method was used in step 911, and if the box was sufficiently reduced, the system returns to step 911 (step 913).

If Criterion C discussed with reference to FIG. 6 above is satisfied, the system records X as a solution and goes to step 901 (step 914).

Using B from step 910, the system next determines the analytically preconditioned function $Bf(x)$ (see Hansen, E. R., 1992, Preconditioning linearized equations, Computing, 58, 187–196). The system then applies term consistency to solve the i-th equation of $Bf(x) = 0$ to bound $x_j$ for $(j=1, \ldots, n)$. If any result is empty, the system goes to step 901 (step 915).

The system then repeats step 903 (step 916).

Next, the system applies box consistency to solve the ith equation of the analytically preconditioned system $Bf(x) = 0$ to bound $x_j$ for $(j=1, \ldots, n)$. If any result is empty, the system goes to step 901 (step 917).

Next, the system repeats step 903 (step 918).

If the Newton method in step 911 reduced the width of the box $X^{(2)}$ by a factor of eight or more, the system goes to step 908 (step 919).

If X is a sufficiently reduced version of the box $X^{(1)}$, the system goes to step 901 (step 920).

Otherwise, the system splits X and then proceeds to step 901 (step 921).

Note that after termination in step 901, bounds on all solutions of $f(x)$ in the initial box $X^{(0)}$ have been recorded. A bounding box X recorded instep 903 satisfies the conditions $w(X) \leq \epsilon_X$ and width $(f(x)) \leq \epsilon_F$ specified by the user. A box X recorded in step 913 approximates the best possible bounds that can be computed with the number system used.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. For example, although the present invention describes the use of derivatives in certain situations, it is often possible to use slopes instead of derivatives.

Additionally, the above disclosure is not intended to limit the present invention. The scope of the present invention is defined by the appended claims.

What is claimed is:

1. A computer-readable storage medium storing instructions that when executed by a computer cause the computer to perform a method for using a computer system to solve a system of nonlinear equations specified by a vector function, f, wherein $f(x) = 0$ represents a set of nonlinear equations, $f_1(x) = 0, f_2(x) = 0, f_3(x) = 0, \ldots, f_n(x) = 0$, wherein x is a vector $(x_1, x_2, x_3, \ldots x_n)$, the method comprising:

receiving a representation of a subbox $X = (X_1, X_2, \ldots, X_n)$, wherein for each dimension, i, the representation of $X_i$ includes a first floating-point number, $a_i$, representing the left endpoint of $X_i$, and a second floating-point number, $b_i$, representing the right endpoint of $X_i$;

storing the representation in a computer memory;

applying term consistency to the set of nonlinear equations, $f_1(x)=0, f_2(x)=0, f_3(x)=0, \ldots, f_n(x)=0$, over X, and excluding portions of X that violate any of these nonlinear equations;

applying box consistency to the set of nonlinear equations over X, and excluding portions of X that violate any of the nonlinear equations; and performing an interval Newton step on X to produce a resulting subbox Y, wherein the point of expansion of the interval Newton step is a point x within X, and wherein performing the interval Newton step involves evaluating f(x) using interval arithmetic to produce an interval result $f'(x)$.

2. The computer-readable storage medium of claim 1, wherein performing the interval Newton step involves:

computing J(x,X), wherein J(x,X) is the Jacobian of the function f evaluated as a function of x over the subbox X; and determining if J(x,X) is regular as a byproduct of solving for the subbox Y that contains values of y that satisfy M(x,X)(y−x)=r(x), where M(x,X)=BJ(x,X), r(x)=−Bf(x), and B is an approximate inverse of the center of J(x,X).

3. The computer-readable storage medium of claim 2, wherein the method further comprises:

applying term consistency to the preconditioned set of nonlinear equations Bf(x)=0 over the subbox X; and excluding portions of X that violate the preconditioned set of nonlinear equations.

4. The computer-readable storage medium of claim 2, wherein the method further comprises:

applying box consistency to the preconditioned set of nonlinear equations Bf(x)=0 over the subbox X; and excluding portions of X that violate the preconditioned set of nonlinear equations.

5. The computer-readable storage medium of claim 1, wherein applying term consistency to the set of nonlinear equations involves:

for each nonlinear equation $f_i(x)=0$ in the system of equations f(x)=0, symbolically manipulating $f_i(x)=0$ to solve for an invertible term, $g(x'_j)$, thereby producing a modified equation $g(x'_j)=h(x)$, wherein $g(x'_j)$ can be analytically inverted to produce an inverse function $g^{-1}(y)$;

substituting the subbox X into the modified equation to produce the equation $g(X'_j)=h(X)$;

solving for $X'_j = g^{-1}(h(X))$; and intersecting $X'_j$ with the vector element $X_j$ to produce a new subbox $X^+$;

wherein the new subbox $X^+$ contains all solutions of the system of equations f(x)=0 within the subbox X, and wherein the width of the new subbox $X^+$ is less than or equal to the width of the subbox X.

6. The computer-readable storage medium of claim 1, wherein the method further comprises:

evaluating a first termination condition, wherein the first termination condition is TRUE if, zero is contained within $f'(x)$, J(x,X) is regular, wherein J(x,X) is the Jacobian of the function f evaluated as a function of x over the subbox X, and the solution Y of M(x,X) (y−x)=r contains X; and if the first termination condition is TRUE, terminating and recording X as a final bound.

7. The computer-readable storage medium of claim 6, wherein the method further comprises:

evaluating a second termination condition;

wherein the second termination condition is TRUE if a function of the width of the subbox X is less than a pre-specified value, $\epsilon_X$, and the width of the function f over the subbox X is less than a pre-specified value, $\epsilon_F$; and if the second termination condition is TRUE, terminating and recording X as a final bound.

* * * * *